United States Patent Office 2,953,224
Patented Sept. 20, 1960

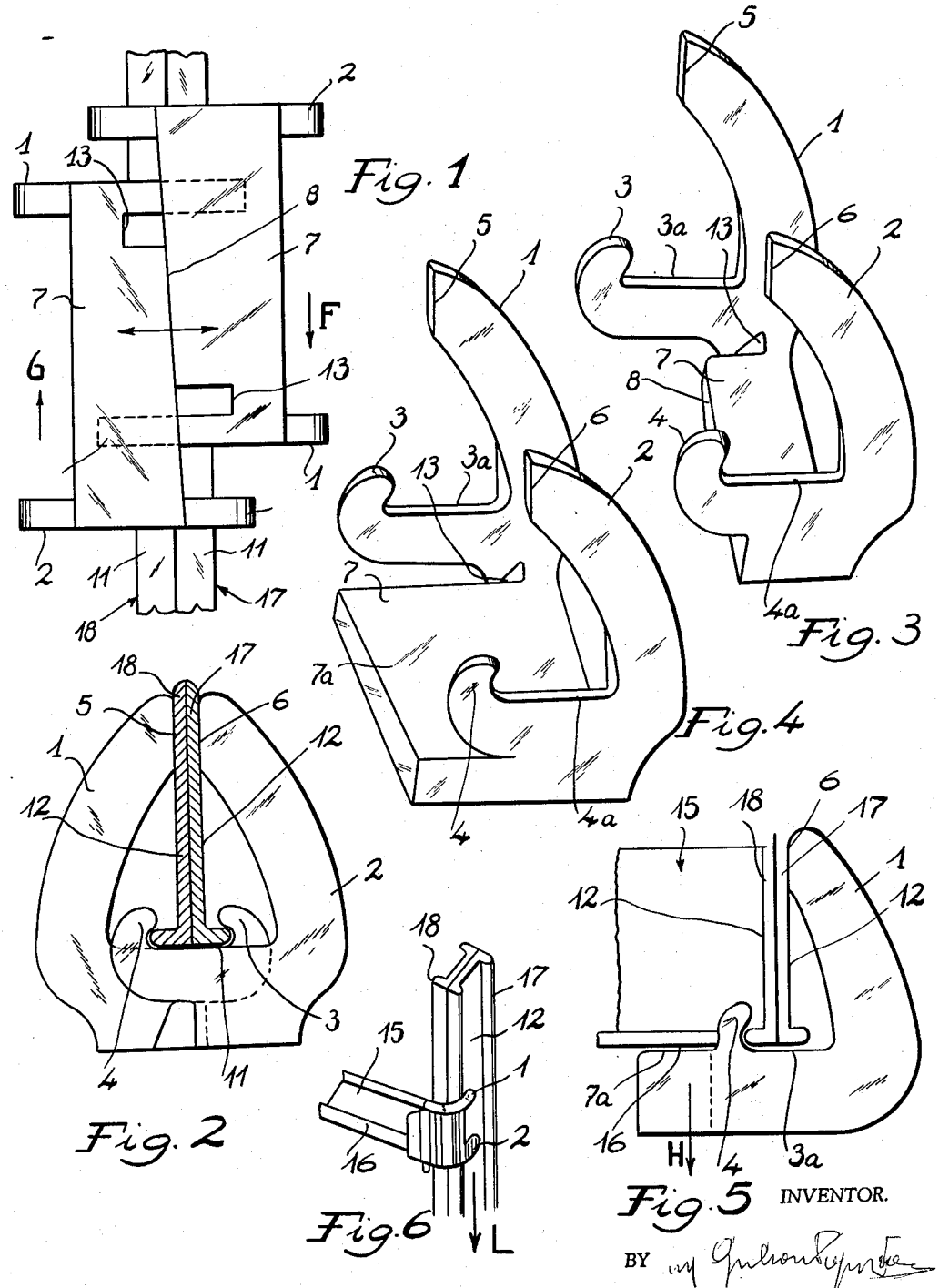

2,953,224

SCREWLESS CLAMP MEMBER

Giuliano Poggi Pollini, Milan, Italy, assignor to Eugenio Anselmi, Milan, Italy

Filed Feb. 14, 1955, Ser. No. 493,435

Claims priority, application Italy Feb. 15, 1954

1 Claim. (Cl. 189—35)

This invention relates to a screwless clamp member for the quick connection of section irons, without the aid of auxiliary means as bolts or like. More particularly, it relates to a screwless clamp member particularly suitable for the connection of section irons, presenting web portions and outwardly directed flanges located at least at one end of said web portions.

According to this invention the screwless clamp member for connecting to each other section irons presenting abutting web portions and outwardly directed flanges located at least at one end of said web portions comprises in combination a pair of identical side flaps; each of said side flaps comprising an upper portion abutting on said web portion of a section iron and a hook shaped lower portion bearing on said flanges of said section irons; a transverse plate rigidly connecting said side flaps and provided with a recess accommodating a hook shaped lower portion of a side flap of an opposed clamp element; an inclined surface extending from said recessed portion along a peripheral edge of said transverse plate.

With these and other objects in view, reference is made to the following specification and accompanying drawings in which there is illustrated the invention, while the appended claim covers variations and modifications thereof which fall within the scope of the invention.

In the drawings:

Fig. 1 shows a plan of two similar clamps according to the invention, arranged in position to grip together two section irons forming part of a lattice structure;

Fig. 2 is an end view of the clamps arranged as in Fig. 1;

Fig. 3 shows a perspective view of a clamp according to the invention;

Fig. 4 shows a perspective view of a clamp according to an alternative embodiment of the invention;

Fig. 5 shows an end view of the clamp of Fig. 4 fitted to a pair of section irons;

Fig. 6 shows a perspective view of the clamp shown in Fig. 5.

Referring now to Figs. 1, 2 and 3 each clamp comprises two substantially G-shaped pairs of side flaps 1 and 2, each provided with a hooked portion 3 and 4, which are conveniently extended forward so that they can be anchored to section irons 17, 18 to be fastened to each other. Two bearing surfaces 4a and 3a, formed on the lower portions of the flaps 1 and 2, rest against the flanges 11 of irons 17, 18. A transverse plate 7 which connects together said two flaps 1, 2 presents a surface 8, formed on its fore portion and inclined to the lower contact line of irons 17, 18.

As can be seen in Figs. 2 and 3, wherein two section irons 17, 18, brought into contact with one another, are shown by way of example, two clamps according to Fig. 1 are fitted in such a manner that the hooks 3 and 4 of clamps can be engaged against the flange 11 of the one section iron 17 (18) and the upper ends 5, 6 are engaged against the web 12 of the other section iron 18 (17).

The arrangement of both clamps must be such that the hooks 1, 2 of one clamp alternate with the hooks of the other, a mating of the inclined planes being thus obtained. The upper ends 5 and 6 are directed against the web 12 of section irons 17 and 18 as shown in detail in Fig. 3. A recessed portion 13 is cut on each clamp, near the connection portion of said transverse plate 7 in order to permit the insertion of a clamp through the other one when the latter is fitted.

By moving the clamps towards one another, in the directions as indicated by the arrows F and G, the hooked portions 3 and 4 are drawn together because of the action of inclined surfaces 8 provided along the fore rim of said plate 7. The two sections irons are thus also drawn together and the upper ends 5 and 6 are tightly pulled against the webs 12 of said irons, thus firmly holding the irons against one another. Referring now to the embodiment shown in Figs. 4-6, in which similar references are appended to similar components, the surface 7a of the plate 7 nearest the side flaps 1, 2 is inclined to the lines of contact of the two section irons 17, 18 instead of the front edge, the inclination being directed towards recess 13 so that the plate is thinner at the recess end.

The inclined surface 7a serves as mating surface for a flanged portion 16 of a further section iron 15, located orthogonally to said irons 17, 18 that are to be fastened together, the whole being designed in such a manner that, by causing the clamp to slide longitudinally according to arrow L along the irons 17, 18 the inclined surface 7a, as soon as it comes into contact with flange 16 of section iron 15, is stressed by a force directed as indicated by the arrow H, thus causing a rotation of the clamp, which results in the flaps 1, 2 being tightly drawn against the section irons 17, 18 to be fastened together. Obviously, such clamps are used individually in the respective fastening points, and might be fitted at points along the whole length of the irons to be fastened together, on alternately opposite sides, in order to minimize the warping forces and/or the forces which tend to cause the section irons to slide along one another.

As will be easily appreciated, the shape of the side flaps will vary to conform to the shape of the cross-section of section irons to be fastened together and clamps of different shape or size will be used when components of different design or sizes are to be assembled.

While but two embodiments of this invention have been shown and described it will be understood that many changes and modifications may be made therein without departing from the spirit or scope of the present invention.

What I claim is:

A clamp member for connecting section irons presenting abutting web portions and opposed, outwardly directed flanges located along at least one edge of said web portions comprising a pair of spaced, parallel, identical side flaps, each of said side flaps having an upper, rearwardly disposed, forwardly directed portion adapted to abut a web portion of one section iron and a forwardly extending, rearwardly facing hook shaped lower portion adapted to engage a flange of the other section iron, a transverse plate rigidly connecting the side flaps at their lower portions, the forward edge of said plate being diagonally disposed with respect to said side flaps for engagement with the corresponding edge of a similar, opposed clamping member, whereby relative sideward motion of one such clamp member with respect to the other in a direction to bring their respective diagonal edges into engagement will force the hook shaped portions of the side flaps to swing rearwardly about the respective upper, rearwardly disposed portions as a pivot and thereby draw the section irons together.

References Cited in the file of this patent

UNITED STATES PATENTS

| | | |
|---|---|---|
| 1,031,660 | Olsen | July 2, 1912 |
| 1,549,632 | Trester | Aug. 11, 1925 |

FOREIGN PATENTS

| | | |
|---|---|---|
| 495,138 | France | Oct. 14, 1950 |
| 805,331 | Germany | May 15, 1951 |
| 861,091 | Germany | Dec. 29, 1952 |